No. 832,044. PATENTED OCT. 2, 1906.
J. DICKASON.
SHAFT COUPLING.
APPLICATION FILED MAY 2, 1906.
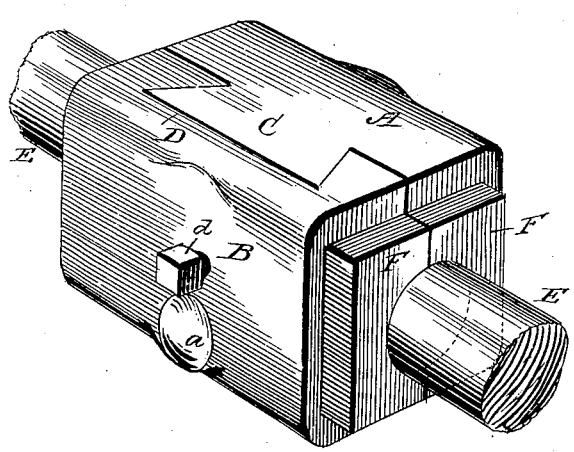
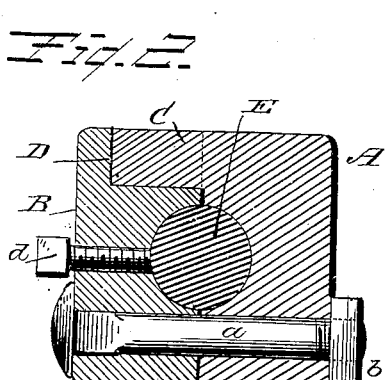
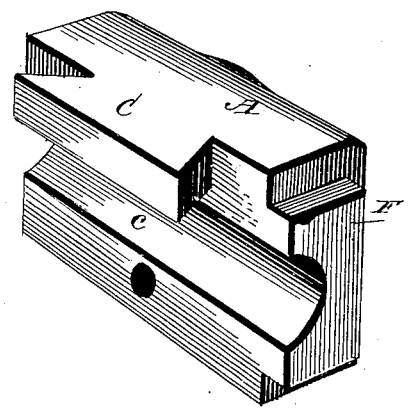
WITNESSES:
INVENTOR
Jonathan Dickason.
BY
Attorney

UNITED STATES PATENT OFFICE.

JONATHAN DICKASON, OF AGOSTA, OHIO.

SHAFT-COUPLING.

No. 832,044.     Specification of Letters Patent.     Patented Oct. 2, 1906.

Application filed May 2, 1906. Serial No. 314,749.

*To all whom it may concern:*

Be it known that I, JONATHAN DICKASON, a citizen of the United States, residing at Agosta, in the county of Marion and State of Ohio, have invented certain new and useful Improvements in Shaft-Couplings; and I do hereby declare that the following is a full, clear, and exact description of the same, reference being had to the annexed drawings, making a part of this specification, and to the letters of reference marked thereon.

The present invention has for its object to provide a shaft-coupling that will be simple in construction as well as with few parts and possessing strength and durability; and it consists in a shaft-coupling constructed substantially as shown in the drawings and hereinafter described and claimed.

Figure 1 of the drawings is a perspective view of a coupling constructed in accordance with my invention, showing it applied to the two ends of the shaft. Fig. 2 is a central cross-section thereof; Fig. 3, a perspective view of one of the coupling-sections.

In the accompanying drawings, A B represent the two coupling-sections, the former section having a dovetail C, which is cast or otherwise integral therewith and adapted to fit in a correspondingly-formed dovetail groove D, so that when the two sections are together a perfect fitting of the two sections is the result. The dovetail C is not separate from the coupling-section, but is integral therewith. Hence only two parts are required in addition to the means employed for holding the two sections together, thereby greatly reducing the cost of manufacture, besides rendering the coupling more durable with increased strength. The two sections A B are held together by a bolt $a$, extending through the same, and a nut $b$, engaging the screw-threaded end thereof, as shown in Fig. 2 of the drawings, or any suitable and well-known means may be employed for this purpose. Upon the inner side of each coupling-section is a semicircular groove $c$, so that when the two sections are together an opening is presented of a circular form to receive the shaft E, said coupling being held thereon by a suitable set-screw $d$. One end of each coupling-section is cast or otherwise formed with a flat-sided projecting shoulder F to engage the hub of a pulley when a pulley is to be used with the coupling, each half or section of the shoulder when together forming a straight or flat-sided projection.

A very simple and effective shaft-coupling is herewith provided with few parts and a coupling that will possess the required strength and durability for the purpose intended.

Having now fully described my invention, what I claim as new, and desire to secure by Letters Patent, is—

A shaft-coupling consisting of two coupling-sections, one of said sections having a dovetail integral projection and the other section having a correspondingly-formed dovetail groove to receive said projection, and each section formed upon its inner side with a semicircular groove at right angles to and independent of said dovetail projection and groove, and a bolt passed through the two sections upon the side of said semicircular grooves opposite said dovetail projection and groove.

In testimony whereof I affix my signature in presence of two witnesses.

JONATHAN DICKASON.

Witnesses:
    R. DICKASON,
    E. F. GRIM.